United States Patent [19]

Carstens et al.

[11] 4,429,211
[45] Jan. 31, 1984

[54] LASER PIPE WELDING SYSTEM FOR NONSTATIONARY PIPE

[75] Inventors: Jeffrey P. Carstens, South Glastonbury; Paul R. Blaszuk, Lebanon; John S. Foley, Manchester, all of Conn.

[73] Assignee: United Technologies Corporation, Hartford, Conn.

[21] Appl. No.: 403,985

[22] Filed: Aug. 2, 1982

[51] Int. Cl.³ .............................................. B23K 27/00
[52] U.S. Cl. ...................... 219/121 LC; 219/121 LQ; 219/121 LV; 219/121 LX
[58] Field of Search ................. 219/121 LC, 121 LD, 219/121 LG, 121 LN, 121 LP, 121 LQ, 121 LU, 121 LV, 121 LX

[56] References Cited

U.S. PATENT DOCUMENTS

| | | | |
|---|---|---|---|
| 4,080,525 | 3/1978 | Gobetz | 219/121 LU X |
| 4,088,865 | 5/1978 | Peters et al. | 219/121 LC |
| 4,088,890 | 5/1978 | Waters | 219/121 LC X |
| 4,327,275 | 4/1982 | Asaba et al. | 219/121 LC X |

FOREIGN PATENT DOCUMENTS 103048  9/1976  Japan ............................ 219/121 LC

*Primary Examiner*—C. L. Albritton
*Attorney, Agent, or Firm*—Eric W. Petraske

[57] ABSTRACT

A laser pipe welding system for welding 360° around a pipe includes a pair of focusing heads each welding half the pipe circumference, a seam tracker to keep the focal spot on the seam to compensate for axial and radial variations, an active beam alignment system for real-time compensation of angular misalignment, and both passive and active-feedback beam transport systems that flexibly follow the focus head.

4 Claims, 7 Drawing Figures

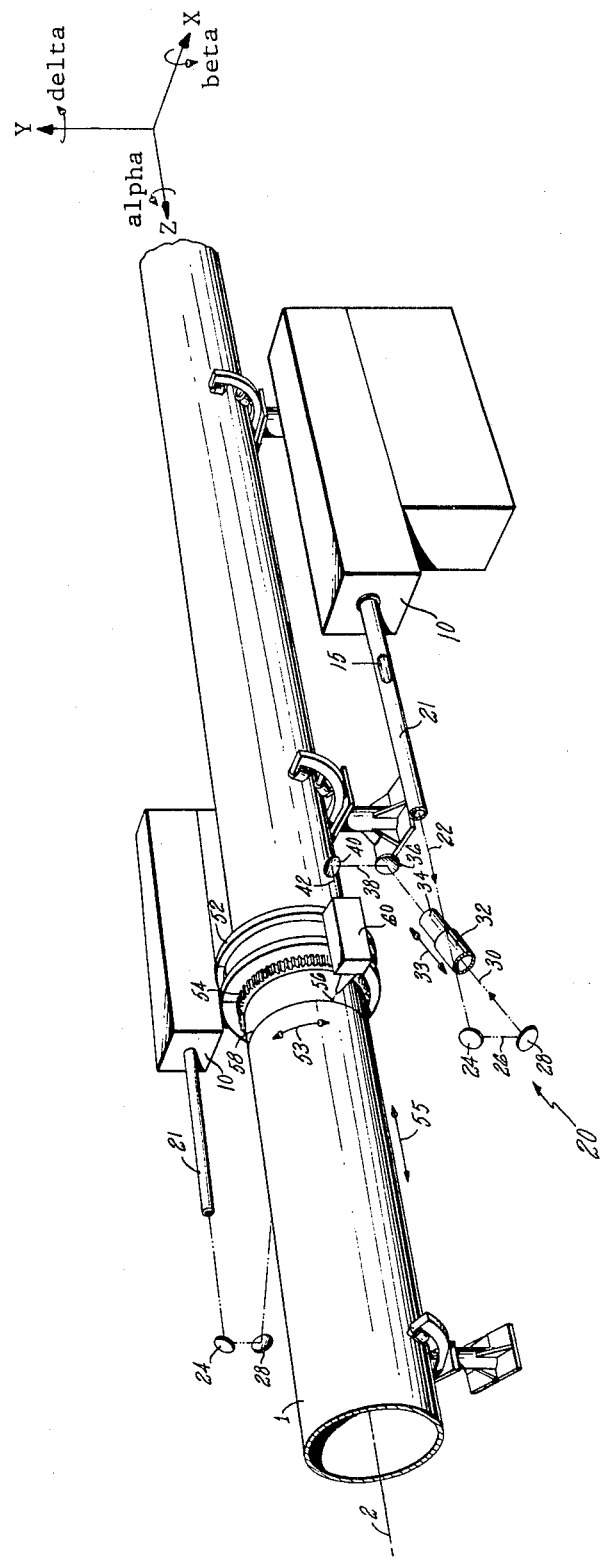

LASER PIPE WELDING SYSTEM FOR NONSTATIONARY PIPE

DESCRIPTION

Technical Field

The field of the invention is that of laser welding systems which weld a seam the full 360° about a large diameter pipe.

Background Art

The advantages of laser welding systems over conventional arc welding systems have been known for some time and include the relatively high speed of the laser, the ability to make a weld in a thick material in a single pass and the superior weld quality. The drawbacks of the laser welding system are also known. The laser requires a close fit between the two pieces to be welded, laser systems typically having a tolerance for the gap between the two workpieces of 3% of the material thickness. Also, the laser beam must follow the weld seam closely, typically with a tolerance of ±0.015 inches for a laser beam focal spot having a diameter of 0.040 inches.

U.S. Pat. No. 4,088,865, issued to Peters et al on May 9, 1978, discloses a laser pipe welding system employing a pair of right angle pipes through which two beams pass, which pipes are dragged about by the force exerted by the two focal heads as they pass about the pipe being welded. The right angle pipe is constrained by its own rigidity and by bearings to travel in a purely rectangular linear path.

U.S. Pat. No. 4,001,543 issued to Bove et al on Jan. 4, 1977 discloses a laser pipe welding system in which the primary laser beam is directed along the axis of the pipe being welded, deflected to a second path parallel to that pipe axis which second path is then rotated about the pipe to form the weld. The primary beam describes a cylindrical surface of revolution as it rotates around the pipe. FIG. 12 of that patent shows an arrangement in which four mirrors slide about a square bounding the pipe and are rotated to direct a beam at the pipe, the focal point of which beam must vary considerably with respect to the pipe surface.

Neither of the two patents above addresses the problem of compensating for a motion of the pipe being welded or for vibration of the optical system. The '543 patent explicitly states (column 11, lines 21-27) that compensating for the motion of the pipe relative to the barge on which the laser is mounted is not part of the invention. This inability to compensate severely restricts the applicability of these two patents to the use of a laser pipe welding system for an offshore pipeline, since it is well known that even in calm seas the barge will move due to wave action and thus there will be relative motion between the pipe and the laser. Also, the powerful engines of these barges vibrate the entire barge, including the optical components of the laser and the beam transport system.

The problem addressed by this invention is that of performing a 360° weld about a large diameter pipe while maintaining the beam transport system in alignment to deliver the focal power precisely along the seam to be welded. A particular application of the subject invention is that of performing welds in a pipeline being laid by a pipe lay barge in which there is relative motion between the pipe being welded and the laser, which relative motion must be compensated for by the optical beam train.

In commercially available laser welding systems which are designed for use in a factory where the workpiece is not moving uncontrollably, a typical tolerable angular deviation of the applied beam going in to the focus mirror is ±1 milliradian. For a beam transport system which includes two to six mirrors extending over a distance of the order of 20 feet, the combined deviation of the several mirrors and the other components which support the mirrors can result in a total angular deviation considerably in excess of this limiting value.

Disclosure of Invention

The invention relates to a laser pipe welding system incorporating means for adjusting the beam transport subsystem to track a pipe that is moving in an unpredictable fashion relative to the laser an/or vibrating.

One feature of the invention is the use of a flexible set of optical beam guides to guide the beam to follow along with a focus head that is rotating about the pipe being welded.

Another feature of the invention is the use of an automatic beam alignment system to correct the angle of the beam entering a focus head.

Another feature of the invention is the use of an active feedback beam transport system to keep the beam to within a fixed plane as the focus head rotates about the pipe.

Another feature of the invention is the use of a mechanical seam tracker to control the radial position of the focus head to keep the focal point on the weld seam even when the weld seam position varies radially due to out-of-roundness of the pipe.

BRIEF DESCRIPTION OF DRAWING

FIG. 1 illustrates in perspective an overall view of a system constructed according to the invention

BEST MODE FOR CARRYING OUT THE INVENTION

Figure 2A:
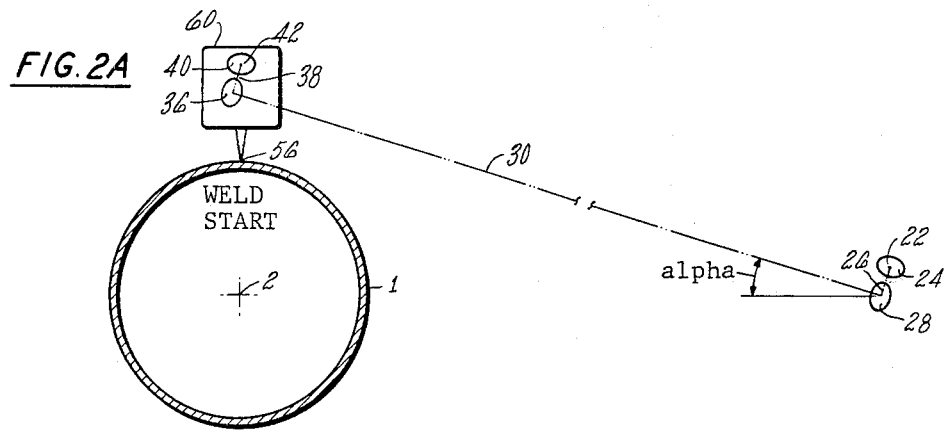
FIGS. 2A-2C illustrate the relative orientation of the mirrors within the beam transport system of FIG. 1 as the focus head rotates about the pipe.

FIG. 1 illustrates in perspective and in partially schematic form a laser pipe welding system in which a large diameter pipe 1, illustratively 3 feet in diameter, and having a center line 2 is being welded by a symmetric pair of welding subsystems. The subsystems comprise laser 10, a beam transport system generally indicated by 20 and described hereinafter, focus and beam alignment system 60 and a clamp 52 which clamps about pipe 1 comprising a support on which beam delivery system 60 is guided and an index gear 54 which serves as an index system for the motors which propel focus head 60 azimuthally about pipe 1. Beam spot 56 travels along seam 58 in the pipe in the direction indicated by the arrow 53. A symmetric half of this overall system comprises a second laser 10 and associated beam transport devices which are not shown in the drawing for simplicity. Each of the counterpart focus heads covers 180° of azimuth about the pipe.

Beam transport system 20, comprising four mirrors 24, 28, 36 and 40 and associated pipes which both support the mirrors and protect personnel from coming in contact with the beam, must flex and bend to travel along with beam delivery system 60 as it rotates about the pipe and also to compensate for motion of the pipe along axis 2 indicated by arrow 55. For convenience, a coordinate system is shown in the drawing having X, Y and Z axes and angular motions about these axes which are referred to respectively as beta, delta and alpha.

Beam 15 emerges from laser 10 traveling within pipe 21. It follows beam axis 22, traveling in the direction indicated by the arrow. It strikes turning mirror 24 which is supported within the pipe, and is constructed so as to be able to rotate an alpha rotation about axis 22 and also a delta rotation about axis 26, the generally vertical axis between mirror 24 and mirror 28. Throughout this description, axes will be referred to as vertical or horizontal whether they are strictly or substantially aligned with the coordinate systems. The alpha rotation about axis 22 of mirror 24 permits the next stage of the beam transport system, that indicated by beam axis 30, to travel to follow beam delivery head 60 as it moves about the pipe. The delta rotation about axis 26 permits the beam 30 to twist about axis 26 to follow motion of the pipe along the direction indicated by arrow 55, which motion may be due to wave motion. Mirror 28 also rotates about axis 26 with a delta rotation and about axis 22 with an alpha rotation. As beam delivery head 60 moves both by rotation about the pipe and by movement of the pipe, the length of beam axis 30 will need to change. This change is taken up by telescoping members 32 and 34 which slide back and forth as indicated by arrow 33. Beam 15 next strikes mirror 36 where it is deflected substantially vertically along axis 38 to mirror 40. Mirror 36 performs a delta rotation about axis 38 and an alpha rotation about axis 42. Mirror 40 performs an alpha rotation about axis 42. The function of these rotations is complementary to that of the rotations of mirrors 24 and 28, i.e. to permit the midsection of the beam transport system to change in angle as beam delivery head 60 rotates and also as the pipe moves. Beam 15 then travels along axis 42 entering beam delivery head 60 which will be described afterwards. The virtue of this embodiment of the invention is that it is substantially self-aligning and is passive so that the complexities associated with actively monitoring the direction of the beam and controlling the mirrors to put the beam where it is wanted are not required. Mirrors 24 and 28 and mirrors 36 and 40 separately form an optical "hinge" which is able to flex about two angles thereby permitting complete flexibility of the beam transport system so it may follow beam delivery head 60 wherever it is moved.

FIG. 2 illustrates schematically a portion of the system in FIG. 1, in particular the middle section of the beam transport system, showing the four mirrors referred to above and their relative positions compared to the pipe and to the focus head as the focus head completes its half circle. In FIG. 2A, one of the two beam delivery systems 60 is shown at the start of a welding pass. System 60 is illustrated schematically by a box, the contents of which will be described later. The beam is focused vertically down to focal spot 56 at twelve o'clock on pipe 1. Mirror 40 is substantially above mirror 36 but not exactly so because of the angle alpha which is governed by the distance between the axis of the laser and the axis of the pipe and by the diameter of the pipe.

Figure 2B:
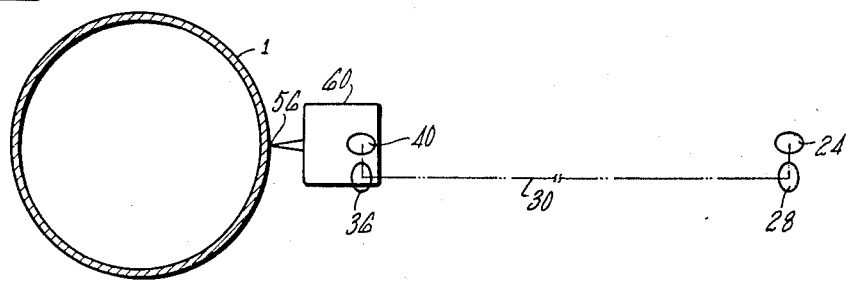
Figure 2C:
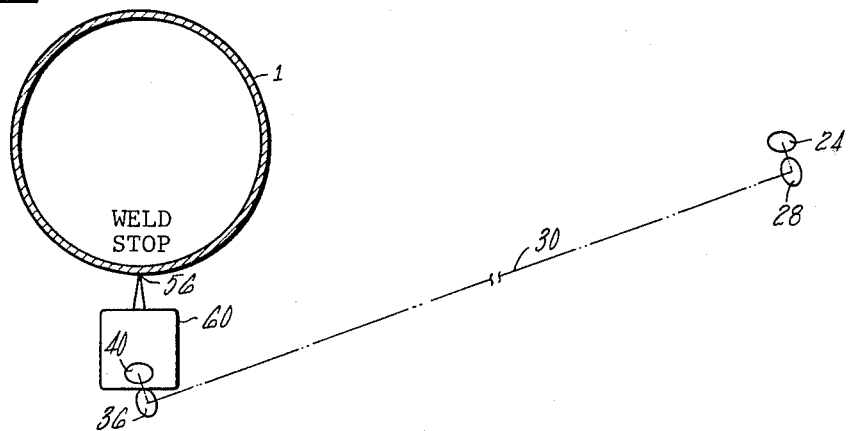

For typical values of a distance of 1 meter between the center of mirror 40 and axis 2 of the pipe, a distance of 3 meters between axis 22 of the laser and axis 2 of the pipe, angle alpha will be one-third of a radian. FIG. 2B illustrates the relative orientation of the components when the focus head is halfway through its pass. Spot 56 is now substantially horizontal compared to mirror 40; beam delivery system 60 has been rotated relative to mirror 40 as it tracks along clamp 52 and maintains its orientation to deliver the final beam substantially radially at the pipe. FIG. 2C illustrates the same set of mirrors at the end of a welding pass. It will be noted that the dimensions of the components must be such that in the case of FIG. 2A mirror 36 does not interfere with clamp 52 or the pipe, and that in the situation of FIG. 2C, that mirror 36 does not strike the deck of the pipe lay barge or whatever blockage there is below the pipe. The other half of the weld of course is being done simultaneously by a second beam delivery system 60 which is omitted from the drawing for simplicity.

Figure 3:
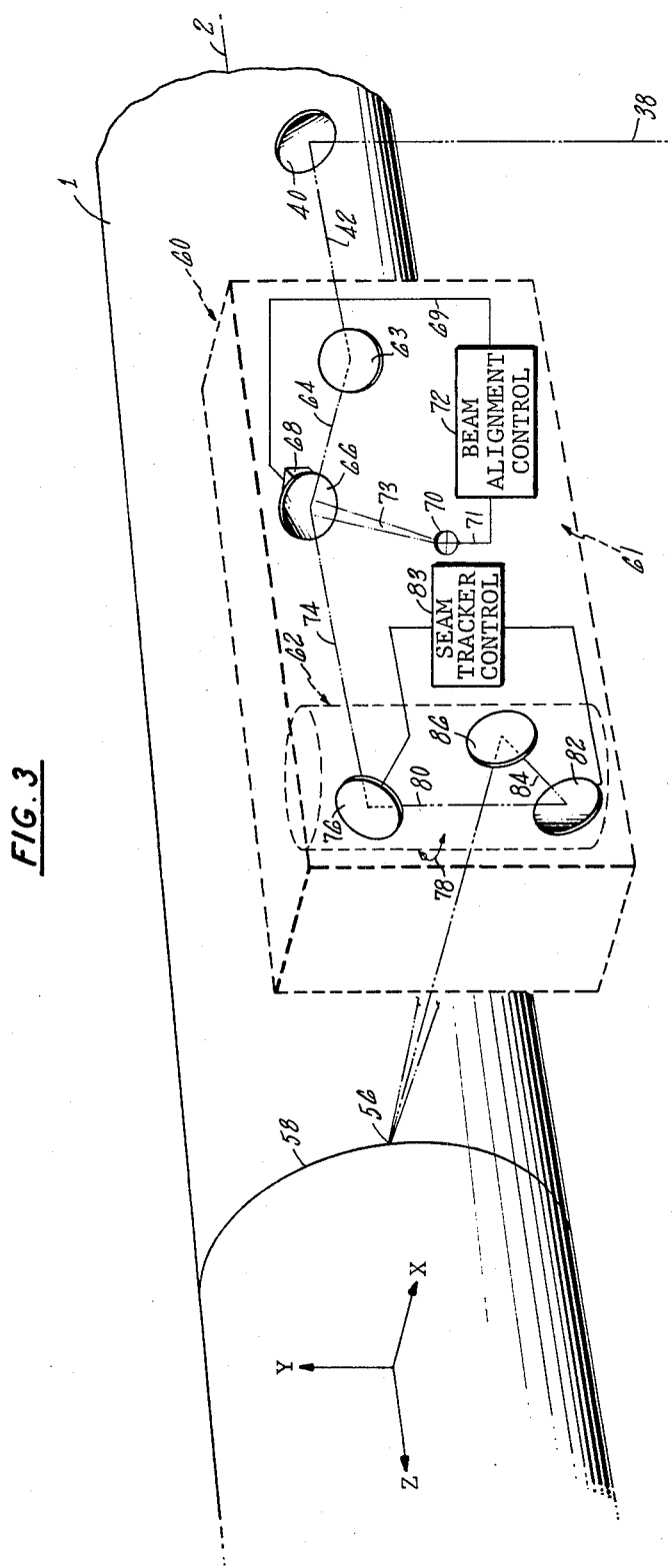
FIG. 3 illustrates a subsystem for the pipe welding system of FIG. 1.

FIG. 3 illustrates in perspective beam delivery head 60 of the system. System 60 comprises two further subsystems, focus head 62, indicated by a dotted line, which comprises a cylindrical mirror 84 and spherical mirror 86 (indicated schematically by a conventional mirror symbol in the drawing) which focus the beam from its initial collimated size of approximately 3 inches in diameter to a final spot size of typically one millimeter in diameter. Such a beam focus head is available from SPAWR Optical Research, Inc. of Corona, Calif. The particular mirror arrangement is not part of the invention. The focal length of the combination mirrors 82 and 86 may be designed at will, of course. Typical values are approximately one-half meter. The focal length being used will generally depend upon the size of the beam and the size of the pipe being welded. The other portion of beam delivery system 60 is beam correction system 61 which comprises turning mirror 63 which receives the beam traveling along axis 42, directs it along axis 64, substantially perpendicular to the pipe in this drawing, where it strikes controllable mirror 66, the orientation of which is controlled in response by actuators 68, conventional actuators known in the art. Actuators 68 are in turn controlled by beam alignment control system 72 which delivers commands along cable 69 Beam alignment control system 72 receives signals along cable 71 from quadrant detector 70. Quadrant detector 70 receives a sample beam from a holographic focusing grating formed in the surface of mirror 66. The formation of such holographic focusing gratings are disclosed in copending application Ser. No. 244,943, filed on Mar. 18, 1981, and assigned to the assignee hereof. These hybrid gratings both deflect a portion of the main beam, as is conventional, and also focus that sample portion to a focal spot. It has been unexpectedly found that the gratings function not only in a single dimension but also in two dimensions so that two orthogonal angles may be detected and controlled. Quadrant detector 70 detects the deviation of the sample beam 73 from its nominal position and beam alignment control system 72 following conventional algorithms, controls mirror 66 to center sample beam 73 on quadrant detector 70. When the system is correctly aligned, a centered sample beam 73 will result in the main beam 74 leaving mirror 66 having the correct angular orientation. This control system thus compensates for the inevitable angular deviation that will result in beam 42 from the buildup of the deviations of the four mirrors which go into the beam transport system. Even if the output beam 22 from the laser 10 is correctly aligned, the mechanical tolerances inherent in any system will result in a deviation of beam 42 as delivery head 60 travels about the pipe. For a conventional focal length of one-half meter, an angular deviation of 1 milliradian will result in a focal spot displacement of 0.05 centimeter, which is tolerable for beam sizes and workpiece thickness which are conventionally used. The actual tolerance in any particular case will depend upon the size of the beam spot, the power in the beam, and the thickness of the workpiece, but this figure of 1 milliradian is a suitable ballpark figure.

The magnitude of the deviation within which beam 42 varies will depend on the particular system in question, of course. For a system for a small pipe having, say, a transverse mechanical tolerance in the beam transport system of 1 millimeter and a length between the axis of laser 22 and the axis of pipe 2 of 1 meter, a typical angular tolerance will be 1 milliradian and a beam correction system may not be needed at all. In such a case, beam correction system 61 may be eliminated from the system with resulting benefit in cost. For those systems in which the tolerance is such or the degree of criticality is such that correction is required, this foregoing system 61 will serve to align beam 74 along its nominal path.

It will not be sufficient, in general, to direct the beam from path 74 onto focus spot 56 without further correction. In particular, clamp 52 will not always be perfectly aligned with the seam so that it will be necessary to move spot 56 back and forth in the Z direction in order to follow seam 58. This may be effected by rotating focus head 62 about axis 80, rotating mirrors 82 and 86 as a unit using a conventional mechanical drive. Such systems for rotating focus heads are conventional and are omitted from the drawing for simplicity. A seam tracker control circuit 83 is illustrated schematically in the figure with a control arrow symbolically directed towards the focus head. The seam tracker which is used may be a conventional mechanical one or it may be an optical one using well known optical principles. The seam tracker follows a groove formed in the outer surface of pipe 1 during the grinding operation in which the edge of the pipe is prepared for welding.

Similarly, the distance between focal head 62 and the surface of pipe 1 may not be constant as the focus head travels about the pipe. The same seam tracker control circuit 83 responds to a detection signal indicating the deviation of the pipe surface from the nominal diameter and controls another rotating conventional device which rotates focus head 62 together with mirror 76 about axis 74 as indicated by the arrow labeled 78. This rotation about 74 changes the relative position of the focal spot 56 and the surface of pipe 1.

It is not necessary that all the components of the system described above be utilized in all applications. It has already been stated above that controllable mirror 66 and its associated turning mirror 63 may not be required in all cases. Similarly, if clamp 52 may be reliably mounted parallel to seam 58, it may not be necessary to employ a seam tracker and controls to adjust the radial position or the Z position of focal spot 56. It may be convenient to put actuators on mirror 40 and use it both to deflect the beam and to adjust the angle of the beam as it enters the focus head. This approach would save two mirrors, with improved beam transfer efficiency and lower cost at the expense of a more complex mounting for mirror 40. Also, it is not necessary that the sampling grating be on the movable mirror. It may be more convenient to control some other mirror.

Clamp 52 has been illustrated as having a single half-round gripping member that provides a track for a conventional drive as it travels around the pipe along gear 54. A clamp that grips the pipe on both sides of seam 58 may be used, if that is preferred. Such a clamp would provide reinforcement for the conventional internal gripping device (not shown) that maintains the two ends of the seam in correct alignment. A clamp need not be used in all cases. The function of the clamp could be performed by any other drive that will move the focus head around the pipe at a fixed radius. For example, a pair of conventional X, Y drives may be used under a control algorithm that steps the focus head in a close approximation of a circle, together with a rotating focus head responding to a seam tracker to keep the focal spot on the seam.

A second embodiment of the invention is illustrated in FIG. 4 in partially pictorial, partially schematic form. This embodiment is considerably simpler mechanically than the previous one, with the penalty of increased complexity in the control electronics. This embodiment employs an active feedback control system to control the beam's transport system. Pipe 21, issuing from laser 10 and containing within it beam 15 traveling along axis 22, has telescoping members 108 and 110 which are similar to telescoping members 32 and 34 of the previous embodiment. The control for drive 106 will be described later. Beam 22 is deflected by turning mirror 24 but turning mirror 28 is eliminated. The beam then leaves along axis 30 passing through telescopic members 32 and 34 as before. Instead of striking mirrors 36 and 40 it now strikes controllable mirror 66 directly. Sample beam 73 strikes quadrant detector 70 as before. The main beam then leaves mirror 76 along axis 74, striking mirror 76 and 82 and 86 as before. The focal depth control and seam tracking control system also is as in the previous embodiment and is omitted from this drawing for simplicity.

Mirrors 24 and 66 are maintained in correct alignment to compensate for the motion of the pipe along the Z axis by driver 106, which responds to the motion of mask 202 to generate signals that measure the pipe displacement. An electrical resistance system or a mechanical device may also be used for the same purpose.

With the beam striking mirror 66 under the control of the active feedback system, the angular deviation of the beam tracking along axis 74 will be in the range for which the control system of mirror 66 may compensate as before.

Figure 4B:
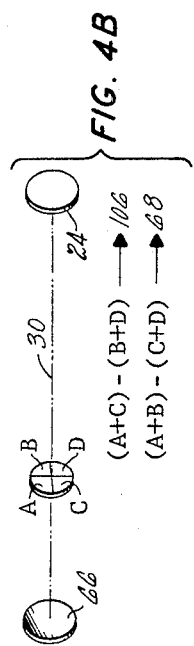
FIGS. 4A and 4B illustrate an alternative embodiment of a beam transport system employing an active feedback control.
Figure 4A:
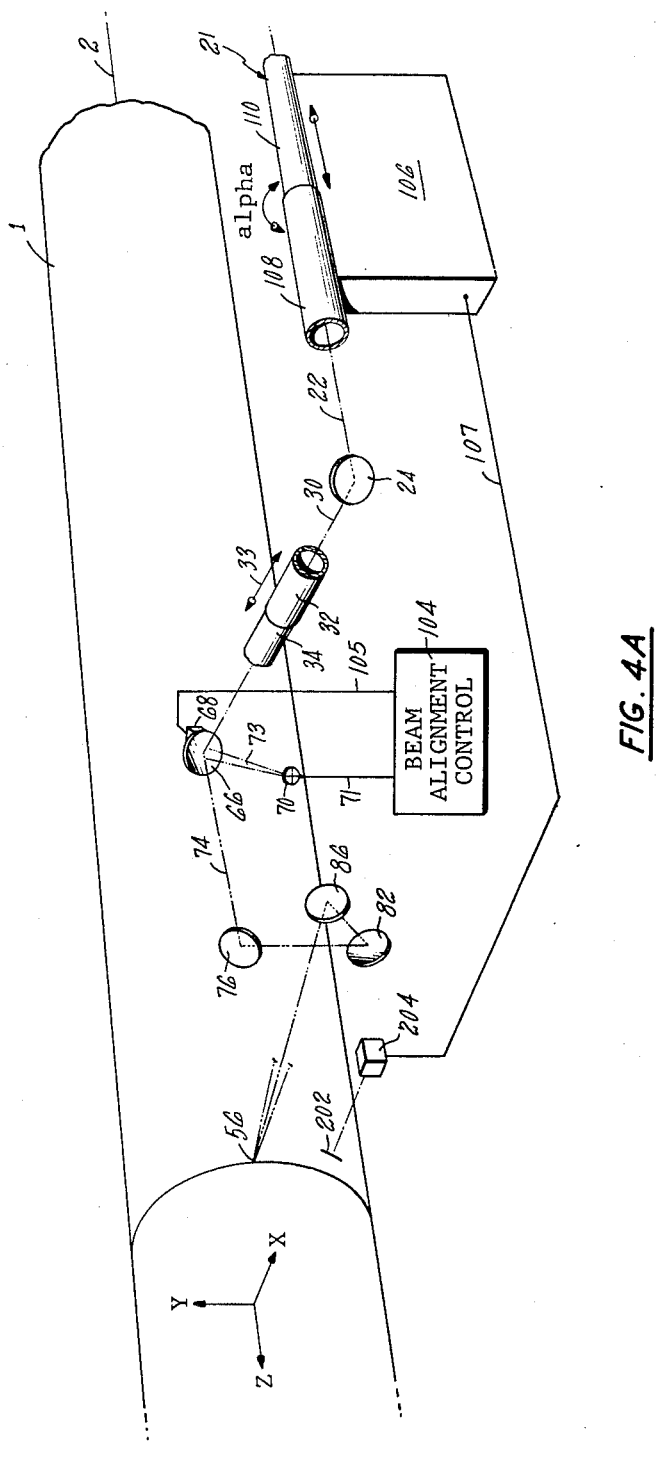

An alternative embodiment would use signals from detector 70 to maintain mirrors 24 and 66 in alignment and also to keep the beam along axis 74. Beam alignment control 104 receives signals from quadrant detector 70 along cable 71 as before but processes the signals differently. In FIG. 4B elements 66, 24 and 70 are shown together with beam line axis 30 to illustrate that the two mirrors and the quadrant detector are constrained to be in a single plane through which beam axis 30 passes. Quadrant detector 70, having four quadrants A, B, C and D, is aligned as shown in the drawing with two segments A and B above axis 30 and two segments below it. With the axis of sample beam 73 at 45° to the axis of beam 30 (in the plane defined by mirrors 66 and 24 and detector 70), correct alignment will result in a signal in which the signal $A+C$ is equal to the signal B+D. This will be the case when mirror 24 and mirror 66 are correctly aligned in a single vertical plane perpendicular to the axis of the pipe. The deviation between the signal A+C and the signal B+D serves as the discriminant to control driver 106 and driver 106 is controlled by conventional circuits 104 to maintain those two pairs of signals in balance. Since the beam alignment is controlled actively, there is no need for mirror 66 to rotate in a delta rotation about the Y axis because that is compensated for by driver 106. Therefore, controller 68 receives the quantity A+B minus the quantity C+D which serves to control beam 74 in angular rotation beta about axis 30. These two angular rotations are sufficient to align beam 74 correctly as in the previous case. FIG. 4A and 4B are shown for the particular case in which the plane defined by mirror 66, detector 70 and mirror 24 is horizontal but that is not necessary. These three points will, of course, determine a plane and that plane need not have any particular orientation with respect to the pipe being welded or with the horizontal so long as the signals from quadrant detector 70 are aligned consistently with the plane so that the beam line 30 is controlled to be at a correct angle. In fact, during the welding operation, the plane defined by mirror 66, quadrant detector 70 and mirror 24 will tilt both above and below the horizontal.

The period of wave motion is of the order of tens of seconds, so that there is no response time difficulty in controlling the beam to compensate for this motion. Conventional drivers for mirror 60 will also be able to compensate for the lower frequency components of the barge's vibration spectrum.

What is claimed is:

1. A laser pipe welding system for welding pipe comprising:

at least one laser for generating a collimated optical beam along a first beam axis;

means for transporting said collimated optical beam to a focus head;

focus head means for focusing said collimated optical beam to a focal spot for welding said pipe;

driving means mounted on said pipe for rotating said focus head azimuthally about said pipe; and seam tracking means for controlling said focus head to properly follow the correct welding path during said rotation of said focus head;

characterized in that:

said means for transporting said optical beam comprises a first turning mirror rotatably mounted along said first beam axis and oriented to deflect said beam along a second beam axis, said first mirror being mounted in first mounting means to rotate about said first beam axis;

a second turning mirror, rotatably mounted along said second beam axis and oriented to deflect said beam along a third beam axis, said second turning mirror being mounted in second mounting means to rotate about said second beam axis, which second mounting means is mounted to rotate about said first beam axis;

a third turning mirror, disposed along said third beam axis, for deflecting said beam along a fourth beam axis and being rotatably mounted in third mounting means to rotate about said fourth beam axis;

a fourth turning mirror disposed along said fourth beam axis for deflecting said beam along a fifth beam axis extending into said focus head means, said fourth turning mirror being mounted in fourth mounting means to rotate about said fifth axis, and said third mounting means being mounted to rotate about said fifth axis, whereby said beam is transported from said laser to said focus head means during motion of said focus head about said pipe.

2. A laser pipe welding system according to claim 1, further characterized in that:

said means for transporting said optical beam includes means for detecting a deviation of said collimated beam from a nominal path and means for generating control signals in response to said deviation and means for controlling a mirror within said means for transporting said collimated optical beam in response to said control signals in order to compensate for said deviation.

3. A laser pipe welding system for welding pipe comprising:

at least one laser for generating a collimated optical beam along a first beam axis;

means for transporting said collimated optical beam to a focus head;

focus head means for focusing said collimated optical beam to a focal spot for welding said pipe;

driving means mounted on said pipe for rotating said focus head azimuthally about said pipe; and seam tracking means for controlling said focus head to follow a predetermined welding path during said rotation of said focus head;

characterized in that:

said means for transporting said optical beam comprises a first turning mirror rotatably mounted along said first beam axis and oriented to deflect said beam along a second beam axis, said first mirror being mounted in first mounting means to rotate about said first beam axis;

a second turning mirror, rotatably mounted along said second beam axis and oriented to deflect said beam along a third beam axis extending into said focus head means, said second turning mirror being mounted in second mounting means to rotate about said third beam axis;

means for detecting a deviation of said collimated beam from a nominal path and means for generating control signals in response to said deviation; and driving means responsive to said control signals for moving said first mirror parallel to said first beam axis to compensate for said deviation, whereby said beam is transported from said laser to said focus head means during motion of said focus head about said pipe.

4. A laser pipe welding system according to claims 2 or 3 in which said means for detecting said deviation further comprises a holographic off-axis focusing grating formed in a mirror surface of one of the mirrors of said beam transporting means for sampling a portion of said beam and for focusing said sampled portion onto an optical detector within said means for generating control signals.

* * * * *